US005788135A

United States Patent [19]
Janek

[11] Patent Number: 5,788,135
[45] Date of Patent: *Aug. 4, 1998

[54] TELESCOPABLE MONORAIL SUPPORT WITH DEMOUNTABLE WHEELED CONTAINER

[76] Inventor: Nikolas Christian Janek, 9175 Morning Mist, Clarkson, Mich. 48348

[*] Notice: The term of this patent shall not extend beyond the expiration date of Pat. No. 5,620,126.

[21] Appl. No.: 713,851

[22] Filed: Sep. 13, 1996

Related U.S. Application Data

[63] Continuation-in-part of Ser. No. 611,124, Mar. 5, 1996, Pat. No. 5,620,126.

[51] Int. Cl.$^6$ ............................................. B60R 9/06
[52] U.S. Cl. .................... 224/527; 224/282; 224/502; 224/506; 224/521
[58] Field of Search ......................... 224/280, 282, 224/488, 502–509, 521–532; 414/462

[56] References Cited

U.S. PATENT DOCUMENTS

| | | | |
|---|---|---|---|
| 2,136,157 | 11/1938 | Thomas . | |
| 4,593,840 | 6/1986 | Chown ................................. | 224/527 |
| 4,915,276 | 4/1990 | Devito ................................. | 224/529 |
| 5,018,651 | 5/1991 | Hull et al. . | |
| 5,029,740 | 7/1991 | Cox . | |
| 5,038,983 | 8/1991 | Tomososki ........................... | 224/527 |
| 5,106,002 | 4/1992 | Smith et al. . | |
| 5,215,234 | 6/1993 | Pasley ................................... | 224/527 |
| 5,310,100 | 5/1994 | Liscinsky ............................. | 224/527 |
| 5,395,020 | 3/1995 | King . | |
| 5,439,151 | 8/1995 | Clayton ................................ | 224/509 |
| 5,460,304 | 10/1995 | Porter et al. ......................... | 224/521 |
| 5,518,159 | 5/1996 | DeGuevara ........................... | 224/282 |
| 5,544,799 | 8/1996 | Didlake ................................ | 224/282 |
| 5,586,702 | 12/1996 | Sadler ................................... | 224/282 |
| 5,620,126 | 4/1997 | Janek .................................... | 224/282 |

*Primary Examiner*—Henry J. Recla
*Assistant Examiner*—Gregory M. Vidovich
*Attorney, Agent, or Firm*—Alfred D. Lobo

[57] ABSTRACT

A cargo carrier assembly (or "carrier") is externally carried at the rear of a truck. The carrier comprises a monorail support in combination with a wheeled container specifically adapted to be pivotably loaded onto the monorail by using pivot latches which matingly receive locking pins fixedly secured to the container. The monorail ("M") comprises (i) an elongate rectilinear slider shank connecting the M to the truck, and (ii) a support beam telescopable on the slider shank. Only a portion of the base of the container is either directly supported on the M, or supported on pivot pins secured to the base. Though the container may be secured with only two pivot latches and an attachment latch, it is preferred to use, in addition, a second attachment latch. The width of the wheeled container is chosen so that it can be rolled in an inclined position through a doorway of a conventional dwelling, and the length is chosen so that, when loaded on the support beam the container does not obscure the tail-lights of the truck.

11 Claims, 7 Drawing Sheets

TELESCOPABLE MONORAIL SUPPORT WITH DEMOUNTABLE WHEELED CONTAINER

This application is a continuation-in-part application of Ser. No. 08/611,124 filed Mar. 5, 1996, now issued as U.S. Pat. No. 5,620,126.

BACKGROUND OF THE INVENTION

This invention relates to a cargo carrier assembly (or "carrier") comprising a non-rotatably telescopable monorail support in combination with a wheeled container, the carrier being externally carried at the rear of a pick-up truck, minivan, or sport-utility vehicle, individually and collectively referred to as a "truck" hereafter.

Numerous solutions to the problem of carrying a container for cargo outside an automobile or truck at the rear thereof, have been presented over the past six decades or so, each solution depending upon the light in which the problem was perceived. Moreover, the dimensions of the container were rarely accorded much weight. In the novel carrier described herein, the container and its dimensions are essential considerations, as is the requirement that it be removably mounted, in its transport position, in close proximity to the rear exterior vertical surface of the rear bumper of the vehicle, or the exterior surface of the rear gate or hatch, preferably no more than about 15.25 cm (6 inches) therefrom. Use of the carrier on a typical passenger automobile is excluded because the carrier is unsuited for such purpose.

Nearly a half a century ago, in U.S. Pat. No. 2,136,157 issued to Robt. J. Thomas, he disclosed a rearwardly extending swing-away rectangular frame on which a trunk is carried at the rear of an automobile, and the trunk is swung out of the way, in the vertical plane. U.S. Pat. No. 5,018,651 to Hull et al discloses a unitary T-shaped connection member, arms of which support a dumping container pivotably mounted on the T. Any end of the T may be inserted in a socket of a hitch on the frame of a truck. The container is designed to be loaded empty and dumped, since if preloaded, there is no provision for lifting it on to pivot hinges on the cross-arm of the T. Further, the container is built on a tubular steel or angle iron framework and is not wheeled. The swivel wheel disclosed in '651 is for attachment to any point on the T-shaped beam. The container may be pivoted in any direction depending upon which end of the T is inserted in the trailer hitch. Irrespective of the direction in which the container is to be pivoted, the cross-arm of the T is provided with hinges permitting the container to be pivoted about the longitudinal axis as shown in their FIG. 1, or about the transverse axis as shown in their FIG. 2, so that the container may be dumped from the side or from the end. The longitudinal direction, corresponding to the forward and rearward directions in which the truck travels, is referred to as the x-axis herein; and the transverse direction at right angles to the longitudinal axis is referred to as the y-axis.

U.S. Pat. No. 5,029,740 to Gary L. Cox discloses a wheeled frame or dolly to which a container for luggage is integrally secured so that the dolly can be rolled to and releasably locked to a support arm uniquely designed to lift the dolly onto a support structure. Besides requiring the container to be secured to the dolly by means of straps placed within the container, it is necessarily transported in an inclined position behind the vehicle, rather than in a horizontal position in which it would not interfere with the driver's rear view through the rear window. To raise the container and dolly by pivoting it as shown, the pair of pivot arms used to lift the dolly into place requires a force far greater than that required to pivot the same container about twin oppositely disposed pivot pins positioned near the mid-points of the sides of a container, as is done in the surprisingly effective and simple invention described herein.

U.S. Pat. No. 4,938,399 to Hull et al discloses a carrying box, chest or frame affixed or welded to a main support beam which in turn is welded to a first slider shank removably secured in the trailer hitch ("tube receptacle receiver"). A trailer is attached by a second slider shank carrying a ball joint. The rear doors of the van illustrated in their FIG. 1 can only be opened if the first slider shank and main beam on which the carrying box is fixed, are first removed as a unit from the receptacle on the truck.

SUMMARY OF THE INVENTION

It has been discovered that a container having a rigid base may be adequately supported on a monorail support means ("M") comprising a single rigid longitudinal support beam or first strut telescopably interconnected with a demountably secured rigid second strut or slider shank which together directly support only the area of the base directly above the monorail. The M comprises the telescopable assembly. The support beam ("outer or overlying strut") is provided with a pair of longitudinally spaced-apart pivot means which allow the container to be pivotedly loaded onto and locked, and later, unloaded from the monorail, but only from the side of the support beam on which the pivot latch means is located. These pivot means, carried only by the support beam, also function as latches, hence are referred to as "pivot latches", when they receive and lock pins ("locking pins" or "pivot pins") disposed on the sides of the tub. In addition, the wheeled container is secured with at least one, and preferably two additional attachment means, typically latches which do not provide pivotability. The slider shank ("inner or underlying strut") is removably secured in a receptacle ("trailer hitch socket"), typically a square tube fixed to the frame of the truck.

It is therefore a general object of this invention to provide a cargo carrier for a truck, the carrier comprising a rigid telescopable monorail and a wheeled container having a tub of box-like rectangular configuration with a rigid base which tub is manually, demountably locked on the upper surface of the monorail without the use of tools. An important feature of the M is that the support beam presents a planar upper surface to minimize the effect of bending stresses on the base of the tub. In the collapsed or closed position of the monorail, the mounted, wheeled container is maintained in a transport position with the forward edge of the tub closely adjacent and parallel to the truck's rear bumper. Access into the rear of the truck, with the container locked on the support beam of the monorail, is gained by sliding the container back (away from the rear of the truck) on the slider shank.

An essential feature of the container is that the axis of its wheels is near one end of the tub. The tub also has pivot pins secured on or near the container's rigid base, the pins being located at a critical distance from the axis of the wheels, such that the pins may be received in pivot latches on the support beam without the wheels being lifted off the ground. The mounting of these pivot pins in longitudinally opposed, spaced-apart relationship, when matingly received in the pivot latches determines that only that portion of the base of the tub directly overlying the M is supported, this supported portion being a minor portion, typically less than 10%, of the area of the base. Moreover, the tub is preferably frameless, being molded from a synthetic resinous material, optionally reinforced, preferably provided with a rigid metal plate under the base, the metal plate resting upon the support beam. Alternatively the tub may be formed from a light metal such as aluminum, the base being thick enough to be essentially rigid. By essentially rigid is meant that when the tub is loaded and placed on the support beam, there is no deflection at either end of the tub visible to the human eye.

It is a specific object of this invention to provide a telescopable monorail support in which the support beam is non-rotatably translatable on the slider shank. The support beam has a cross-section (in a plane at right angles to its longitudinal x-axis) which cooperates with that of the slider shank forming a telescopable assembly in which the support beam is non-rotatably longitudinally telescopable on the elongate slider shank. It is critical that the length of the slider shank allow the support beam with the container on it, to be moved rearward far enough to allow opening the rear hatch, doors or gate to provide access into the rear of the truck.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Numerous suggestions for carrying a container on a rack have been proffered to date, but none has suggested a carrier comprising a combination of a monorail and a wheeled container designed and constructed to allow it (i) to be pre-loaded conveniently, for example with luggage, in a room of a house or motel/hotel (referred to as a "dwelling"); (ii) to be wheeled in an inclined position through conventional doors of the dwelling (such doors are generally about 30 inches wide, or 76 cm wide) to a position near the rack; then, without lifting the container off the ground, (iii) to be pivoted on cooperating pivot means (fixedly disposed on both the container and the support beam) to lock the container on the support beam, manually, by a single person of average strength, without using tools. Upon arriving at one's destination dwelling, the person may unload the container by (i) unlocking the locking means and pivoting the container without lifting it off the rack, so that the wheeled end of the container contacts the ground, then (ii) wheeling the container through conventional doors into the dwelling so that the luggage is transported from the truck in a single trip. The wheeled container, specifically designed as described to cooperate with the monorail support, thus permits the luggage to be easily and conveniently transported to a destination, then wheeled into the dwelling. This avoids leaving the contents of the container unattended outdoors, albeit still within the container which is typically provided with a lid locked to its body.

Figure 1:
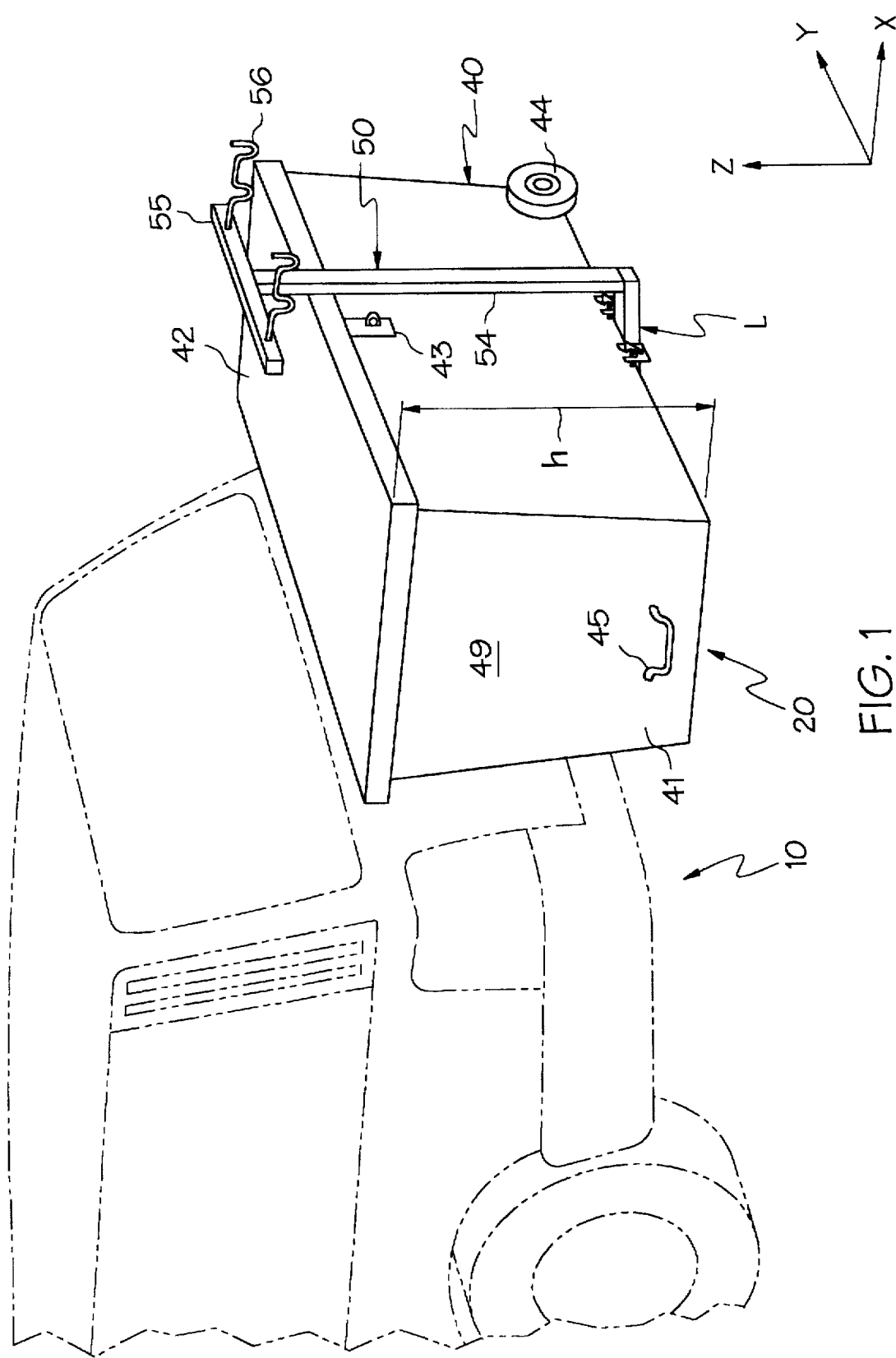
FIG. 1 is a generally schematic view of the carrier in transport position, the carrier including a monorail, a wheeled container, and, optionally a T-shaped accessory rack all carried behind a 4×4 sports utility vehicle provided with a socket for a trailer hitch fixedly attached to the frame of the vehicle.

Referring to FIG. 1 there is shown a 4×4 sport utility vehicle, indicated generally by reference numeral 10, to which a carrier assembly, indicated generally by reference numeral 20 is removably attached. Typical of such sport utility vehicles are the Chevrolet Blazer, the Ford Explorer, and the Nissan Pathfinder. Other suitable vehicles are pick-up trucks such as the Dodge Ram, the Ford F150 and the Chevrolet C-1500 or K-1500. Still other suitable vehicles are vans and minivans. The "cargo carrier" or "carrier assembly" 20 refers to a combination of monorail assembly and the wheeled container indicated generally by reference numeral 40, which is secured to the monorail with pivot means which also serve as attachment latches. Optionally, for use as a bicycle carrier, ski rack and the like, a removably mounted, accessory rack 50 of arbitrary construction, preferably having a vertical T-shape, with appropriate accessory suspension means, is provided.

The wheeled container 40 has a tub 41 with a rigid base 47 particularly adapted to be pivotably loaded onto the monorail M, the tub preferably being generally rectangular in cross-section, preferably with a lid 42 for the tub, both made of light weight but strong materials. The tub 41 is provided with at least one pair of spaced-apart pins 61 and 62 protruding longitudinally from near the tub's planar base in opposite directions. The pins are to be secured in pivot latches (hence referred to as "locking or pivot pins"). The tub is provided with additional locking means fixed near the tub's base, which locking means cooperate with at least one of the pivot latches. Most preferably the locking means cooperate with both pivot latches 71 and 72 and two attachment latches 73 and 73' either above or below the upper surface of the support beam, to secure the container. The latches are preferably welded in positions so as to each matingly receive a locking pin introduced in the desired direction whether horizontally or vertically. The preferred combination of two pivot latches, and third and fourth attachment latches, 73 and 73' (see FIG. 6A), and locking pins on the tub for each latch, is unexpectedly effective and easy to use, despite physical constraints of positioning the container closely adjacent to, preferably within about 30.5 cm (12") of the outer surface of the rear door and bumper of the truck which constraints appear to militate against using many known attachment means for manual operation. Thus the weight of a loaded container is kept as close to and above the truck's rear axle as is practical.

Though a tub of conventional construction may be used, in the most preferred embodiment, the tub has no planar framework either internally or externally (hence "frameless tub") to support the load carried in it, and when transported on the truck, the tub is preferably secured with a pair of attachment latches in addition to the pair of pivot latches. The container may be loaded indoors with so much luggage that the container cannot be lifted off the ground by only one person; thus, goods including luggage, may be conveniently arranged within the tub with due care while indoors, irrespective of weather conditions outdoors, so that optimum packing is achieved for the travel conditions expected, and the container may then be wheeled outdoors through the doorways.

When the wheeled container 40 is positioned on M, the container's length (longest dimension) lies along the transverse y-axis; its width lies along the longitudinal x-axis; and its depth lies along the z-axis. The wheeled container 40 can be rolled along the ground in an inclined position, preferably on a pair of wheels 44 mounted, optionally vertically telescopably, one on each side, near each lower corner at one end of the container's base.

More particularly, the monorail allows a pre-loaded wheeled container to be rolled to the truck in an inclined position on two wheels, pivoted onto, and then secured on the support beam. Further, it is critical that the length of the container (y-axis, when the container is on the rack) be less than the transverse distance (y-axis) between the truck's rear lights; the width is also critical since the container is required to pass through a conventional doorway of a dwelling when transported in an inclined position; and, the depth (z-axis) of the container is such that the lid of the container lies in a plane in which the view through the rear-view mirror of the truck is not obscured, preferably below the lower edge of the truck's rear window. Because of the limited depth of a tub which is typically available by a combination of such physical considerations, the internal volume of the container is <1 m$^3$ (cubic meters), in the range from about 15–30 ft$^3$ (0.42–0.85 m$^3$). Such considerations include the dimensions of a conventional truck, the load in the container which a person can conveniently handle, and the load which will not adversely affect the handling of the truck, normally less than 200 Kg (440 lb).

It will now be evident that the cargo carrier comprises in combination, a wheeled container 40, and M, comprising an elongate slider shank 34 at least 30.5 cm (12") long for connecting an overlying support beam 32 to the truck's frame. The container 40 has a box-like tub 41 having a generally planar base 47 and end-walls 49, 49' (not visible) rising vertically from the ends of said base, together defining an interior space having closed ends and an access opening above said base. The container 40 has a rigid unitary body with an internal volume of more than 15 ft$^3$ (cubic feet) and is too large to be carried exteriorly of a conventional automobile; and, if the container is used for its intended purpose as described herebelow, the loaded container transported on an automobile would adversely influence the normal operation and handling of the automobile. The container is demountably locked along the longitudinal axis of the support beam 32, and optionally, an accessory rack 50 is demountably attached to the support beam, the accessory rack comprising a vertical T-shaped member on which accessory articles such as skis or bicycles may be carried. Wheel means 44 are mounted at one of said closed ends for rolling movement of the container on the ground, the wheels being rotatable on axle means disposed near one end of the base. The wheel means includes a pair of oppositely disposed wheels disposed exteriorly of the base and end-walls without being recessed therein.

Figure 2:
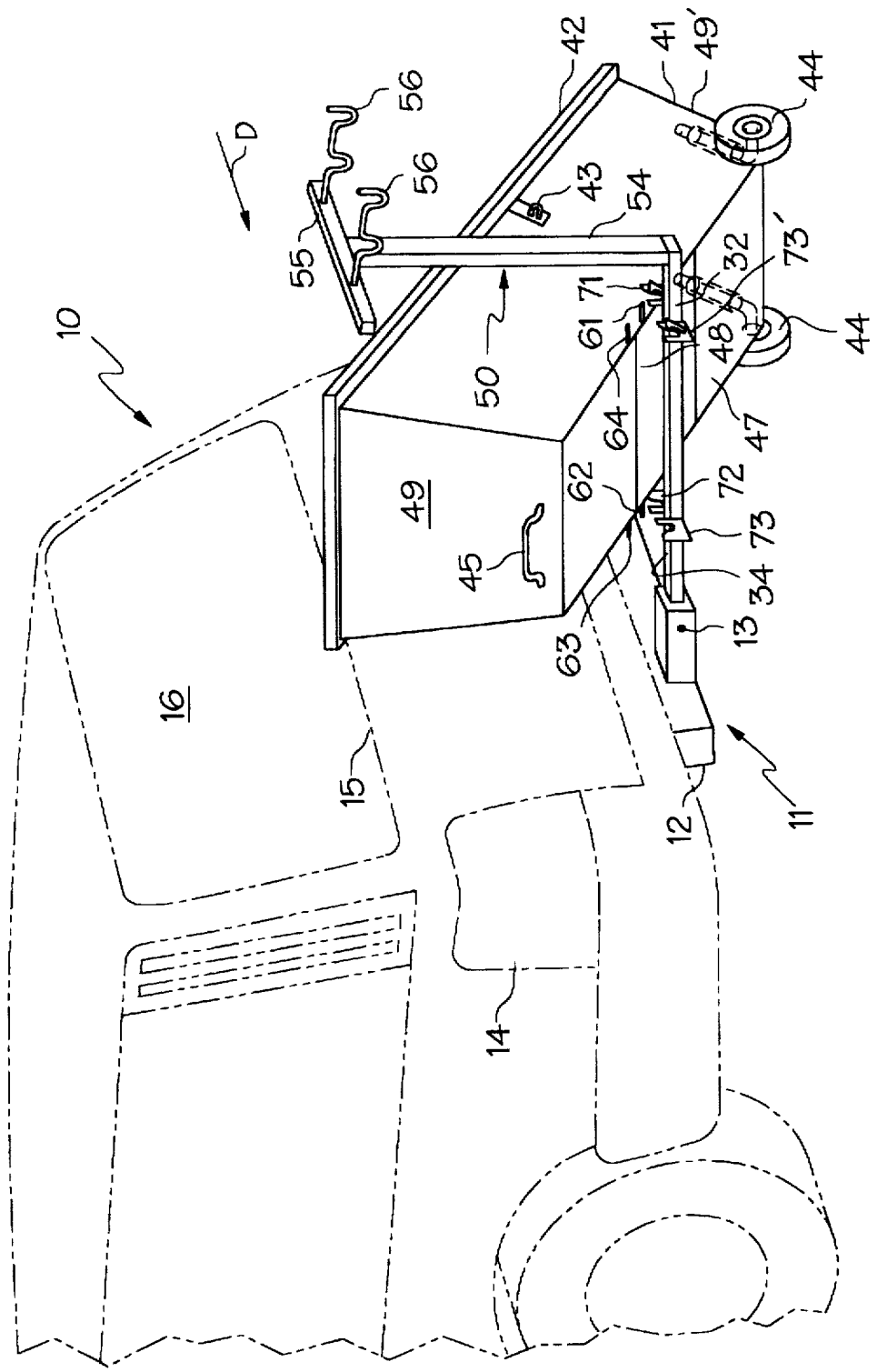
FIG. 2 is a generally schematic view of the container as it rests in position to be pivoted onto the monorail. The accessory rack shown in position, may be positioned before or after the container is positioned. Locking pins on or near the bottom of the tub of the container are held in a pair of oppositely disposed pivot latches along the longitudinal x-axis of the rack so that the container may be pivotably disposed on the support beam.
Figure 5A:
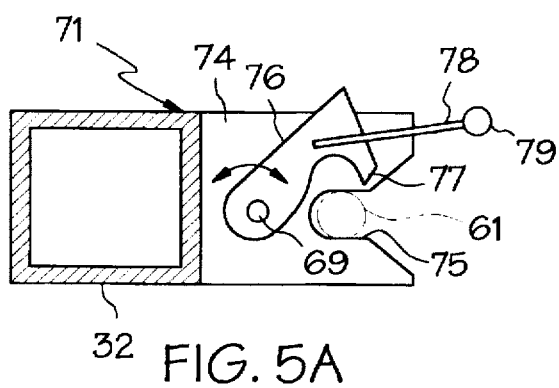
FIG. 5A is a detail of a locking pin (shown in phantom outline) in an attachment or pivot latch fixedly secured on the support beam, with the latch's U-shaped slot opening to one side, the latch in a horizontal position.

Referring to FIG. 2, there is shown a slider shank 34, removably connected in a securing means such as square tubular socket 11 of the trailer hitch on the truck's frame 12 with support beam 32 slidably disposed on the slider shank 34. Pivot latches 71 and 72 are positioned as shown in FIGS. 5A and 5C, with U-shaped slots 75 opening on the passenger's side (right hand side) of the monorail so that wheeled container 40 can only be loaded onto support beam 32 in the direction of the arrow D, that is, from the side on which the pivot latches are secured, which in the drawing, is the right hand side of the truck. To be loaded from the left hand side of the truck the pivot latches 71 and 72 are preferably positioned with their U-shaped slots opening on the left hand side of the monorail. Positioning the pivot latches with their U-shaped slots opening directly upwards makes it more difficult to fit the locking pins into the slots.

Figure 6A:
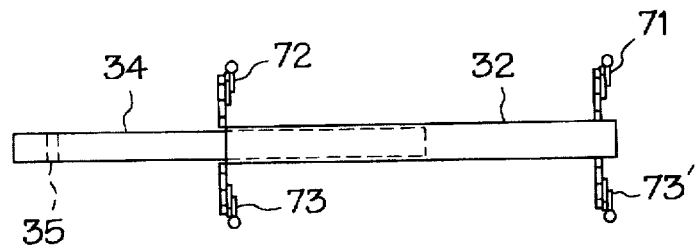
FIG. 6A is a plan view of the monorail with a pair of pivot latches and a pair of attachment latches on the support beam providing one attachment latch opposite each pivot latch.
Figure 6B:
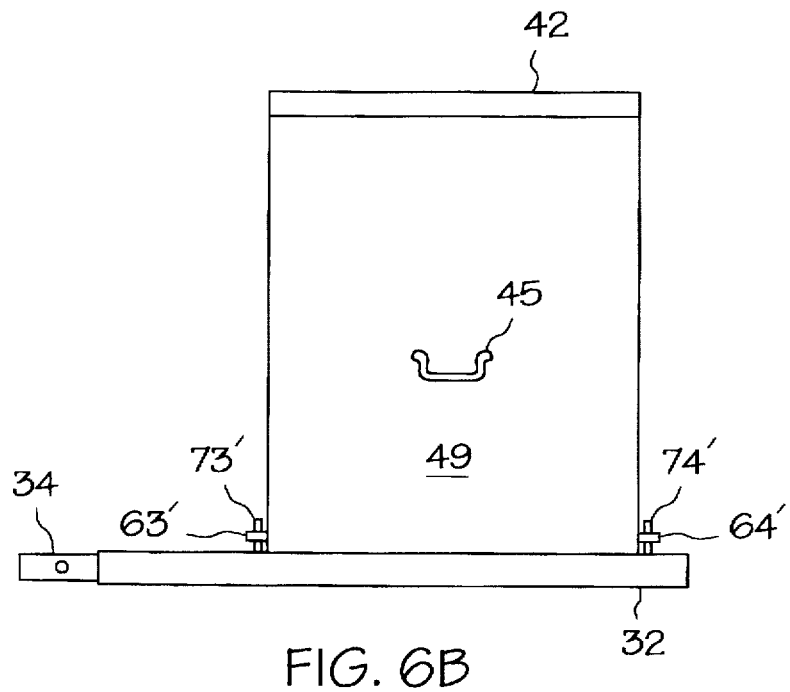
FIG. 6B is a side elevational view of the monorail in FIG. 6A showing the tub of the container resting on the support beam.

The vertical end-walls 49, 49' and preferably integrally formed base 47, may be formed from glass fiber reinforced ("GFR") synthetic resinous (plastic) material, a metal composite or aluminum. Alternatively, the tub may be formed from a substantially rigid unreinforced plastic material. By "substantially rigid" is meant that the tub, upside down, can support a load of about 300 lb (136 Kg), or the weight of two average persons standing or sitting on the tub's planar base with no readily visible deflection of the base or walls. The tub is preferably rigid enough to be supported on its locking pins without also supporting the lower surface of its planar base. However, to minimize stresses on the base, it is preferred to support the planar base, preferably with a rigid metal plate 48 with projecting locking pins 61, 62, 63 secured near the base, secured in their latches, or, with the locking pins integrally molded into the base (FIG. 6B). A preferred container is 117 cm long×68 cm wide×71 cm deep (46"×27"×28") and has an interior volume sufficient to carry plural suitcases and/or other personal effects, such as hiking or biking gear (collectively referred to as "luggage" hereafter), which would not only occupy too much space if stored within the vehicle, but would also be required to be handled individually for loading and unloading into the truck. A suitable container without wheels or locking pins, is commercially available from Better Way Products Inc., New Paris, Ind. 46553.

The unique design of M allows it to be connected to the truck only by the slider shank, but necessitates the wheeled container be side-loaded and unloaded onto the support beam from one direction only, that being the side on which the pivot latches are fixed, and, in its preferred embodiment, only from the direction in which the slots of the pivot latches open. Loading and unloading is done by pivoting the container about the longitudinal axis (x-axis) of the support beam. The support beam is most preferably formed from rectangular steel or aluminum tubular stock. The rectangular stock presents a large enough surface so as to avoid the generation of stresses within the matrix of the synthetic resinous material from which the container is preferably formed. Such stresses are relatively large when the container rests on cylindrical tubing and such stresses are deleterious to the useful life of the tub.

The monorail M is attached to the truck with the single elongate slider shank 34, preferably also having a rectangular cross-section which slidably fits within the support beam 32. The slider shank 34 is necessarily long enough to allow the support beam enough longitudinal movement, without demounting the container, to open the truck's rear hatch or gate. The sliding shank 34 is typically more than about 46 cm (18 ins) long, preferably in the range from 50 cm (20") to 76 cm (30") long. The position of the container moved away from the rear of the truck, that is, distally disposed, is referred to herein as having the support beam in an "extended position". In the transport position, when the truck is to move with the container on the support beam, it is slid forward on the slider shank and locked to it, to position the container close to the rear bumper. The position of the container in the transport position, proximately disposed near the rear of the truck, is referred to herein as having the rack in a "retracted position".

Reverting to FIG. 1, the socket 11 typically has a square cross-section in which the hollow square tubular interior measures about 5.1 cm×5.1 cm (2"×2") which is just large enough to slidably receive the square tubular shank 34. The overlying support beam 32 is preferably also 2"×2". Near one end of the support beam 32, which end is distally disposed relative to tubular socket 11 fixedly secured to the frame 12 of the vehicle, is provided a vertical mounting stub 51 of rectangular tubular steel into which the accessory rack 50 may be removably slidably disposed. Near the other end of support beam 32, the tubular shank 34 slides into the rectangular tubular steel socket 11. The support beam 32 is at least as long as the planar base 47 is wide, and the forward edge of the base is generally parallel to, and in close proximity with the bumper.

As shown in FIG. 2, the accessory rack 50 comprises a vertical tubular post 54, preferably of rectangular stock into the base of which, stub 51 is insertable, and the base is provided with matching passages (not shown) to allow fastening pins to be inserted through the passages when aligned with passages 52 and 53 in the stub 51. The top of the post 54 is secured to a cross-member 55 on which connecting means for accessories, such as suspension hooks 56 (shown), or clamps for skis, are provided for carrying the particular accessory. The simple construction of the accessory T-rack lends itself exceptionally well to be combined with the rack of this invention.

The carrier assembly 20 comprises the monorail M or M' and wheeled container 40, the tub 41 of which preferably has no greater a specified volume than the range set forth above, the tub being provided with a lid 42, preferably hinged. The tub 41 is generally a parallelpiped and the hinged lid 42 is preferably provided with a hasp 43 to lock the container. The container can only be loaded or unloaded from the top when the lid is in the upright position. If loaded with suitcases, plural suitcases may be ganged, positioned so that handles of the suitcases are uppermost. A typical suitcase (not shown) is loaded with its longer dimension along the x-axis so that the depth of the tub is from 10% to 50% greater than the height of the suitcase placed within the tub, but the depth is such that the height "h" of the container 40 with the lid 42 closed is preferably no greater than the distance of the lower edge 15 of the rear window 16 from the upper surface of beam 32. The width of the tub (measured along the longitudinal x-axis) is typically at least as wide as the longest dimension of a typical suitcase. The length of the tub (measured along the y-axis) is less than the distance between the inner edges of the rear tail-lights 14 (only one of which is shown), so the tail-lights are visible from the rear when the container is on the rack. It will now be evident that the tub 41 will be longer than it is wide, and its width is limited by the width of a doorway through which the container is to be wheeled. Such containers are commercially available either formed from GFR plastic, or of thermoformed acrylonitrile-butadiene-styrene ("ABS") copolymer. For optimum rigidity and light weight the container may be made of a suitable synthetic resin reinforced with whiskered carbon fibers using technology conventionally used in the fabrication of golf clubs, tennis rackets and certain military aircraft. Casters 44, preferably solid rubber wheels, are provided along a common longitudinal axis, near opposed lower corners of the tub at its one end. The manner in which the wheels 44 are fixedly attached to the tub 41 is not critical but for optimum adjustability, namely to minimize the vertical distance through which the tub is to be pivoted onto the support beam 32, it is preferred to use telescopable wheels, telescopable along the length of the tub (y-axis in FIG. 1). At its other end, the tub 41 is provided with a handle 45 with which sufficient force is applied to rotate said container in a vertical plane at right angles to the longitudinal axis, onto the monorail.

Positioned between the handle 45 and the common axis of the wheels 44 are oppositely disposed, substantially co-axial locking pins 61, 62 which are matingly received in pivot latch means 71 and 72 when the tub is wheeled against the support beam 32, without lifting the wheels off the ground. The distance of the mounting axis of the pivot pins 61, 62 from the axis of the wheels is therefore at least the same as the height at which the pivot latches 71, 72 are mounted. This height is that of the axis of socket 11 above the ground, typically more than 30 cm (12 ins). The mounting axis of pins 61 and 62 is located less than two-thirds the length of the base, measured from the end having the wheels, and is typically about midway between the ends of the base. The locking pins 61, 62, 63 and 64 are typically in the range from about 0.65 cm to about 1.6 cm in diameter, about 1.25 cm being preferred; and in the range from about 2.5 cm to about 7.5 cm long, about 5 cm being preferred. Such pins are conveniently provided on small laminar pads which are fixedly secured to the base 47 or to metal plate 48. Pads may be in the range from about 2.5 cm×2.5 cm to about 10 cm×10 cm, about 5 cm×5 cm being preferred. The thickness of a pad secured to the base preferably corresponds to the diameter of the pin, the pin projecting from the edge of the pad as shown in FIG. 2. Pads (not shown) may be secured to the sidewalls of the tub, near the base, if the height of the slots in the pivot latches dictates. Pads secured to the sidewalls of the tub, adjacent the base, will have pins projecting at right angles to the surface of the pad secured to the sidewall. Most preferably, the locking pins 61 and 62 are provided on the ends of a metal plate 48 fixedly secured to the base, which plate locates these pins accurately, or are molded into the bases The pads and/or metal plate may be secured to the base with adhesive or with fasteners which are inserted through the base.

As described, the tub 41 is secured on the monorail with at least two longitudinally (x-axis) opposed pivot means, and at least one attachment means, fixed on the tub and rack and two of the attachment means are preferred. At each location, the upper portion of the locking means is fixed on the tub's side-wall just above the tub's planar base 47, but more preferably, is fixed to its base, and the lower portion is fixed to the support beam. The upper portion comprises the locking pin. Pins 61, 62 are matingly held in spaced-apart pivot latch means 71, 72; pins 63, 64 are held in attachment means 73, 73' (see FIG. 6A). The spacing of the pivot latches corresponds to the width of the base of the tub, and is typically slightly greater than the width so as to allow the tub to be pivotably located between the two pivot latches. Attachment means may include a hasp, one portion of the hasp secured to the tub 41 and the other to the support beam 32; or, a clevis through the upper portion of which a bolt is secured. The particular attachment means used is not narrowly critical being chosen for conveniently securing the container on the support beam.

Figure 3:
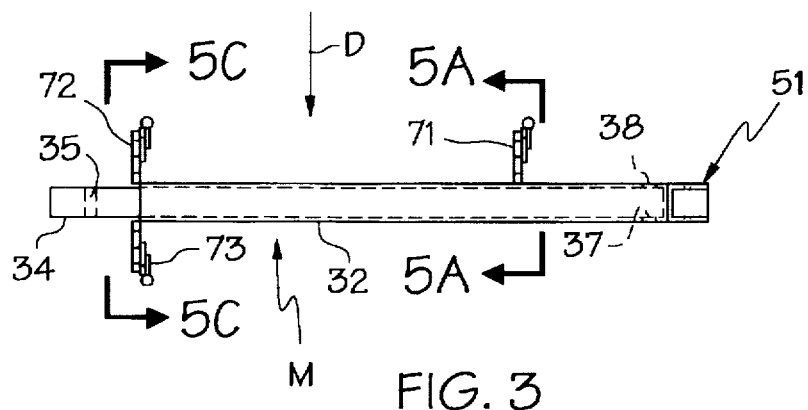
FIG. 3 is a plan view of the support beam in the retracted position on the slider shank (dotted outline), without the T-shaped accessory rack, showing the use of the two pivot latches on the loading and unloading side of the monorail, and an at least one additional locking means such as an attachment latch, on the support beam, on the opposed side of the monorail.

It is essential that the locking means locks the one side of the base of the tub at two longitudinally spaced-apart positions on one side of the monorail, and also at a third position opposite one of the spaced-apart positions. Such a configuration for the locking means is shown in FIG. 3, in which the pivot latches 71 and 72 are in the spaced-apart positions, and attachment latch 73 is at the third position. The tub rests on the longitudinal (x-axis) support beam and the container is supported across the tub's planar base, for transport. The tub is provided with a handle 45 to pull or push the container, and to exert the force necessary to pivot the container onto the support beam. It will be evident that the force required to pivot the container about the longitudinal support beam is a function of the distance from the handle to the longitudinal line ("pivot line") joining the U-shaped slots of the pivot latches, along which line the locking pins 61 and 62 are to be located. The greater this distance from handle to mid-line, the less the force required. But the distance from the pivot line to the axis of the wheels on the bottom of the container determines whether the locking pins can be inserted in the pivot latches on the longitudinal strut without lifting the container off the ground. With vertically telescopable wheels, the locking pins on the tub can be positioned so that the pins may be inserted in the pivot latches, and the tub pivoted into position with a minimum of force.

Referring to FIG. 3, there is shown a plan view of the monorail referred to generally as M, in which the slider shank 34 is provided with through-passage 35, preferably in the transverse direction, as is through-passage 13 in tubular socket 11 (FIG. 2), through both of which a cross-bolt or fastening pin is to be inserted and secured in the usual manner with a locking Cotter pin (not shown). It is essential that each latching means be an attachment means to both, receive a locking pin, then secure it; and, that the locking pin be pivotable in two of the latching means which are spaced-apart on the support beam. Most preferred latching means is one such as pivot latch 71 commonly referred to as an "attachment latch" shown in greater detail in FIG. 5A, as viewed in the direction A—A in FIG. 3.

If all latches, whether three or four, are pivot latches then the container may be loaded or unloaded from either side of the support beam, except that the container would then need to be equipped with another opposed pair of coaxial wheels and also provided with an additional handle on the opposed end-wall. For safety, each of the pivot latches would be oriented at an angle from the horizontal plane. Most preferably all four U-shaped slots would be vertically oriented, the loading and unloading of the container being facilitated by telescopable wheel means.

As schematically illustrated in FIG. 3, slider shank 34 is provided with rectilinear support beam 32 extending longitudinally (x-axis) over slider shank 34 and each is provided near its proximal distal end with matching passages 37 in the shank 34, and 38 in the support beam 32, to allow the locking pin 39 (see FIG. 4) to be inserted through the passages when aligned, to lock the support beam to the shank.

Figure 4:
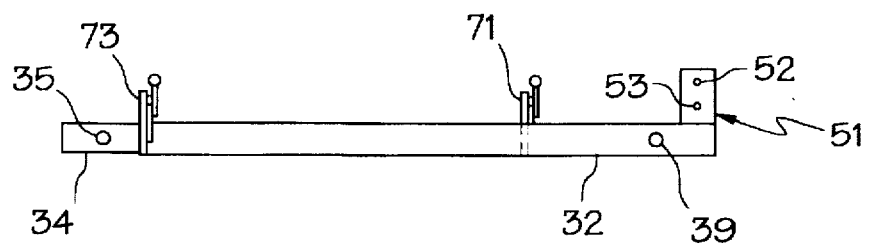
FIG. 4 is a side elevational view of the support beam shown in FIG. 3.

Referring to FIG. 4 there is shown a side elevation view of monorail M in which only one attachment latch 73 is used in combination with the two pivot latches 71 and 72. The support beam 32 and slider shank 34 are locked together in the transport position with a bolt or locking pin 39 inserted through matching through-passages 37 and 38 (FIG. 3) in the slider shank and support beam respectively. If accessory rack 50 is to be mounted (FIG. 2), a stub 51 is provided with a pair of vertically spaced apart matching through-passages 52 and 53 respectively, preferably in the transverse direction, through each of which a fastening pin is to be inserted and secured in the usual manner with a locking Cotter pin (not shown).

Referring to FIG. 5A, pivot latch 71 comprises a laminar plate 74 having a horizontal, generally U-shaped slot 75 with one of its sides (the upper) flared upward to facilitate guiding a locking pin 61 into it. The locking pin 61, shown in phantom outline, is releasably held in the U-shaped slot by a pivotable catch 76, such as either a manually actuated, or a spring-loaded pawl having a hooked end 77 which fits over the locking pin 61. In the manual mode, the catch 76 is pivotable on a pin 69 about an axis at right angles to the plate 74 with a handle 78 secured to the catch at the end of which handle a ball 79 provides enough weight to hold the catch 76 in position over the locking pin 61. Alternately, the hooked end 75 may be held in place over the pin 61 with a safety pin (not shown). The handle 78 is typically welded to the catch 76 at a location which does not interfere with insertion and release of the locking pin in the slot. As shown, pivot latch 71 is fixed to strut 32 so that both the catch 76 and the handle 78 are on the outside of plate 74 so as to allow the tub 41 of the container 40 to be slid between the plates of the latches 71 and 72. Pivot latch 72, constructed in the same manner as pivot latch 71, is similarly fixed to strut 32, with the U-shaped slot 75 in the horizontal position, and its handle 78 on the outside of plate 74. The tub 41 may therefore be received between the opposed plates 74 of pivot latches 71 and 72.

Figure 6C:
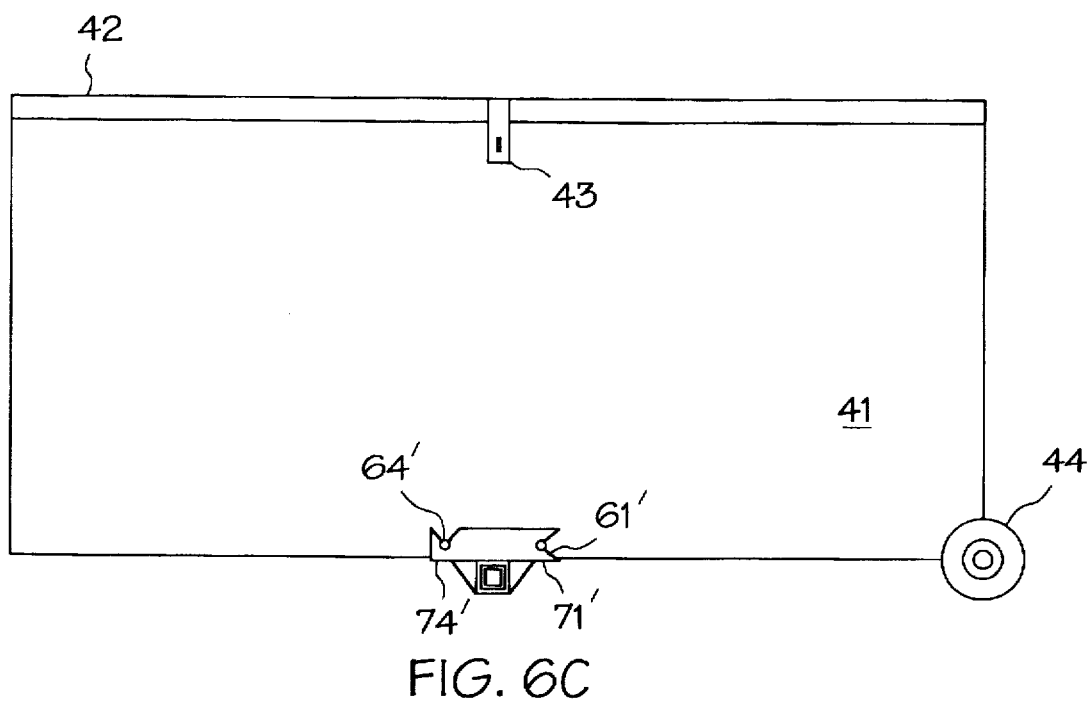
FIG. 6C is a rear elevational view, looking towards the front of the truck of the container resting on the support beam.

It is preferred that the outer surface of the bottom 47 of the tub rest directly on the upper surface of the support beam 32, and that the geometry of the locking pins be adapted so that the pins may be matingly received in the pivot latches and attachment latches, to allow the bottom of the tub to do so. In the specific instance where a tub of synthetic resinous material is used, it is preferred that the locking pins protrude with the appropriate geometry either from the sides of the tub near its reinforced base, or from a metal plate 48 fixed to the outer surface of the bottom 47 of the tub. It is preferred to use a metal plate with four locking pins 61, 62, 63 and 64 which may be the same or different, to be received in two pivot latches and two attachment latches respectively as shown in FIG. 6A. Most preferably, the pins 61 and 62 which are received in the pivot latches 71 and 72 on one side of the beam 32, are the same; and pins 63 and 64 which are received in the attachment latches 73 and 74 on the opposed side of beam 32, are the same, the geometry of the pins depending upon the position and shape of the latches; and, as seen illustrated in FIG. 6C, each pivot latch and opposed attachment latch share a common plate 74' having U-shaped slots 75' and 75".

Figure 6D:
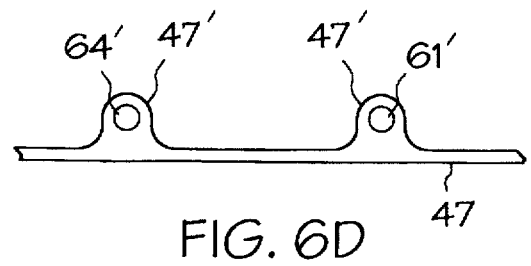
FIG. 6D is a detail of the mid-portion of the base of the tub showing one of the two pairs of locking pins, molded into and projecting from one side of the base.

Referring to FIG. 6D there is schematically illustrated a detail of the mid-portion of the base 47 of the tub 41 showing locking pins 61' and 64' integrally molded into the base. This is done by placing each locking pin at a desired height on built-up reinforced portions 47' of the base 47 and thereafter further reinforcing the portions 47' by laying up successive layers of woven reinforcing fibers, typically glass fibers, and impregnating successive layers with curable resin. The desired height at which the locking pins are molded into the base, at the front and rear sides thereof, corresponds to the position of the U-shaped slots relative to the upper surface of the support beam, so that the base of the tub rests on the support beam when the locking pins are locked in the pivot and attachment latches.

Figure 5B:
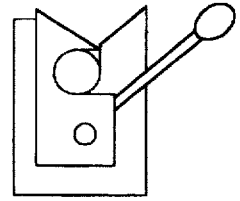
FIG. 5B is a detail of a locking pin (shown in phantom outline) in an attachment or pivot latch fixedly secured on the support beam, with the latch's U-shaped slot opening upward, the latch in a vertical position.
Figure 5C:
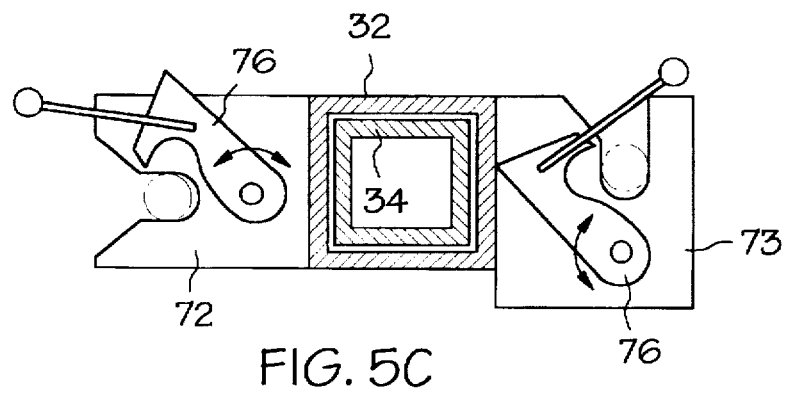
FIG. 5C is a detail viewed in the direction A—A in FIG. 3 of locking pins positioned below the base of the tub which would rest on the upper surface of the support beam.

As shown in FIG. 3, the third latch, attachment latch 73, constructed in the same manner as pivot latches 71 and 72, is similarly fixed to support beam 32, opposite pivot latch 71, except that the U-shaped slot 75 is in the vertical position, shown in the detail schematic illustration FIG. 5B, open at the top to matingly receive locking pin 63 lowered into the opening, and as before, both the catch 76 and handle 78 are on the outside of plate 74. After the tub is pivotedly loaded (with locking pins 61 and 62 in pivot latches 71 and 72) onto the support beam, pin 63 is secured in attachment latch 73 which, as situated, provides no pivotability. The orientation of the U-shaped slots in latches 71, 72 and 73 is not narrowly critical, and may be in either the horizontal or vertical position, but for safety the attachment latch 73 is positioned with its U-shaped slot in an upwardly inclined, preferably vertical, position as shown in FIGS. 2, 3 and 4 to ensure that the container 40 is securely held.

Figure 5D:
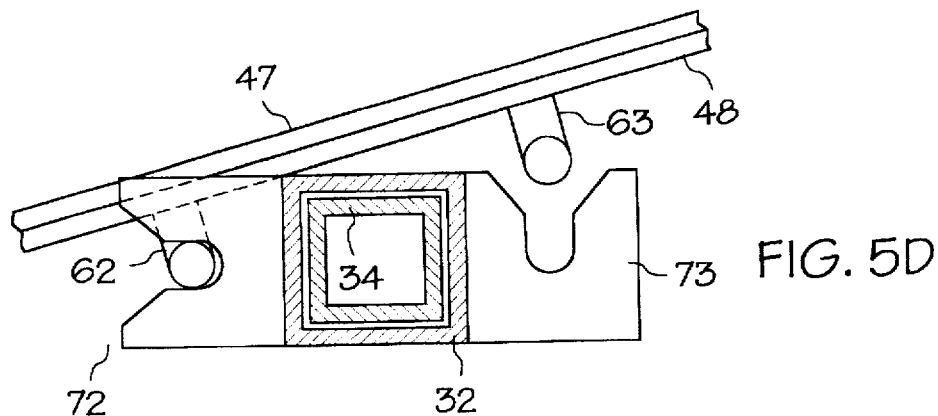
FIG. 5D is a detail viewed in the direction A—A in FIG. 3 of how L-shaped locking pins, secured to a metal plate in the base of the tub are introduced into the U-shaped slots of the pivot latch on the loading side of the monorail, and of the attachment latch on the opposed side of the monorail.

An alternative positioning of pivot latches 71 and 72, and attachment latch 73 is illustrated in FIGS. 5C and 5D in which L-shaped locking pins are so positioned on metal base plate 48 (preferably by welding) secured to the base 47 of the tub, as to allow the base plate 48 to rest on the support beam 32. With the pivot latches 71 and 72 and attachment latch 73 positioned as shown in FIG. 3, and the locking pins 61, 62, and 63 secured to the plate 48, it will be seen that various pin configurations will permit the base plate 48 to rest in contact with the upper surface of support beam 32. As shown, locking pins are provided in the 'near' (relative to the loading direction) half of the tub's base so that when held in pivot latches 71 and 72 on support beam 32, it extends longitudinally across the base plate. The container is thus supported only on the support beam 32.

Alternatively, and less preferred, each of the latches 71, 72 and 73 could be positioned with their U-shaped slots pointing upwards. However, when the locking pins are used which protrude directly outwards from the base plate (rather than L-shaped), and are locked into the latches, the base plate would be spaced away from the support beam.

In FIG. 6A is illustrated a plan view of the most preferred monorail M with a pair of pivot latches 71 and 72, and a pair of attachment latches 73 and 73', one oppositely disposed relative to each pivot latch, so that together the latches secure four locking pins on the base of the tub.

Figure 7A:
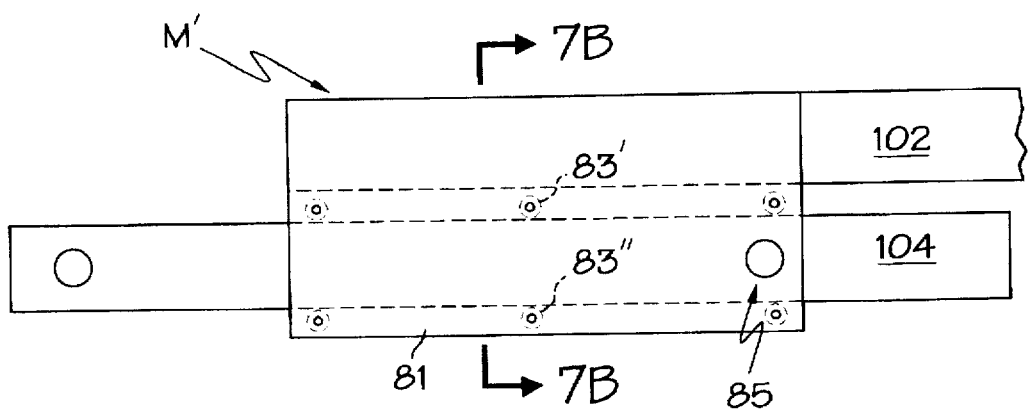
FIG. 7A is a side elevational view of another embodiment of a telescopable support beam spaced apart from an underlying slider shank by bearing means which facilitate slidable motion of the support beam on the slider shank.
Figure 7B:
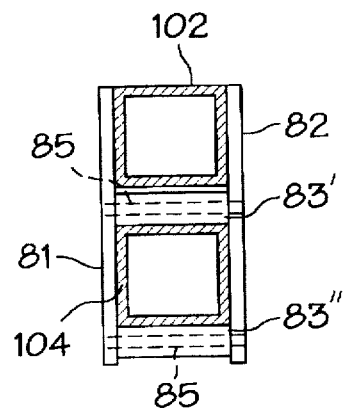
FIG. 7B is a cross-sectional view in the vertical plane along the line 7—7 of FIG. 7A.

Referring to FIGS. 7A and 7B are details of another embodiment of a telescopable monorail M' comprising a pair of vertical parallel plates 81 and 82 spaced apart on each side of the support beam 102, with overlying square tubular support beam 102 sliding on square, tubular slider shank 104, the plates being secured, preferably by welding the outer surfaces of the sides of beam 102 to the inner surfaces of the plates 81 and 82. The plates extend downward on either side of shank 104 and are connected above and beneath it, by upper and lower bearing means 83' and 83" respectively. The support beam 102 is supported on the upper bearing 83' which allows translation of the beam 102 along the upper surface of slider shank 104. Though only the upper bearing means 83' adequately provides for good movement, it is preferred to provide, in addition, the lower bearing means for better movement of a heavy load. The shank 104, in turn, is supported by lower bearing 83" along the lower surface of shank 104 facilitating translation of the beam 102 on shank 104 which is sandwiched between both upper 83' and lower bearing means 83". A pad of substantially rigid, synthetic resinous material having a coefficient of friction lower than that of aluminum on aluminum, such as nylon or Teflon®, allows slidable relative movement of the support beam and slider shank. Most preferred are rollers, whether metal or non-metallic, e.g. nylon, or polyurethane having a hardness of at least 60 Shore D, secured between the plates by pins or shoulder bolts 85 which can be tightened without squeezing the plates together. The plates 81, 82 and shank 34 are provided with aligned matching through-passages for the bolts 85 which lock the components in the telescopable assembly.

Figure 8A:
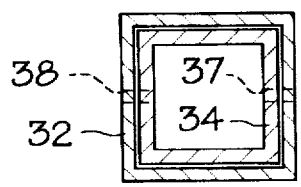
FIG. 8A is a cross-sectional illustration in the vertical plane across the x-axis of a monorail comprising a rectangular tubular slider shank inserted in the rectangular tubular support beam which is telescopable on the slider shank.
Figure 8B:
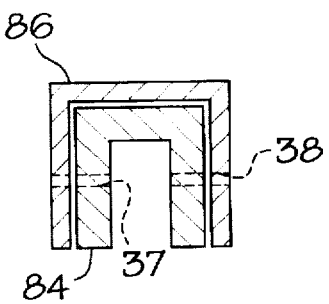
FIG. 8B is a cross-sectional illustration in the vertical plane across the x-axis of a monorail comprising a slider shank of a rectangular channel, and a rectangular channel support beam telescopable over the slider shank.
Figure 8C:
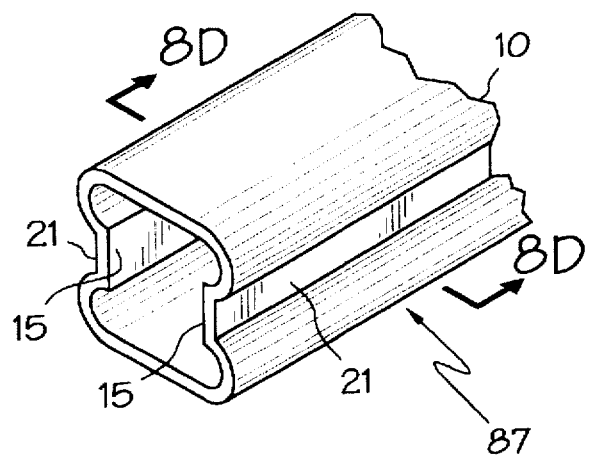
FIG. 8C is an isometric view of another embodiment of a slider shank.
Figure 8D:
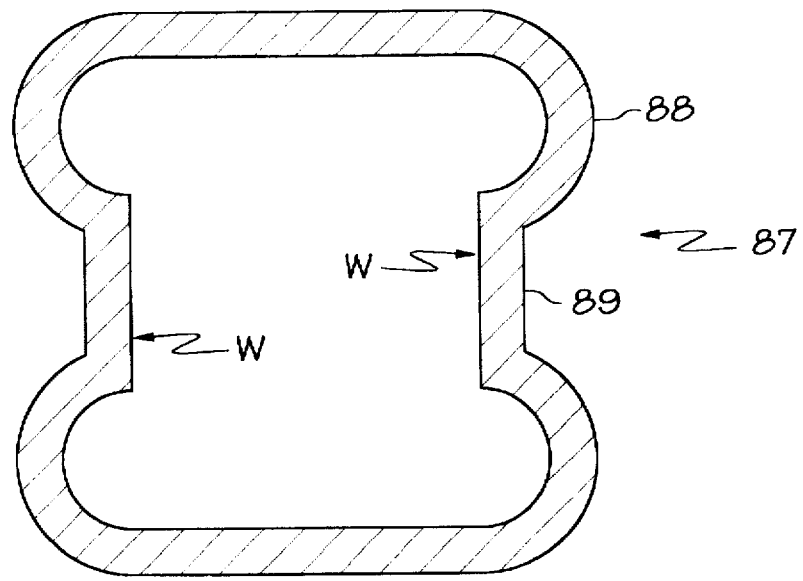
FIG. 8D is a cross-sectional illustration of the slider shank in FIG. 8C.
Figure 8E:
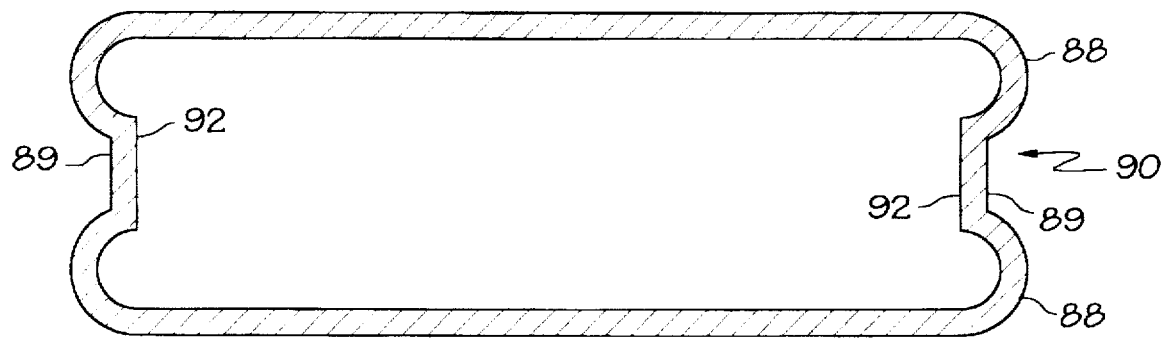
FIG. 8E is a cross-sectional illustration of another embodiment of a slider shank.
Figure 9:
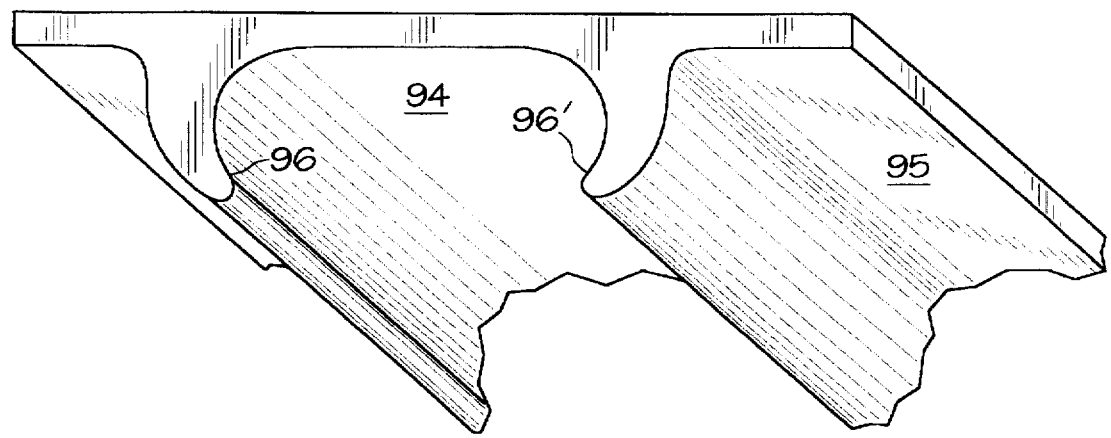
FIG. 9 is an isometric view of a support beam utilized in combination with a slider shank illustrated in FIGS. 8D and 8E.

In the embodiment illustrated in FIG. 8A, showing cross-sections of square tubular stock used for the support beam 32 and shank 34, each is provided with matching aligned through-passages 37 and 38 for a bolt or locking pin 39 to lock them together (FIG. 3). Other support beams and shanks with matched cross-sections may advantageously be used to construct the monorail. Referring to FIG. 8B there is shown a C-channel slider shank 84 embraced by C-channel support beam 86 with through-passages 37 and 38 respectively. Referring to FIG. 8C is shown a section of generally square box-shaped tubing 87 having rounded corners 88, the opposed side walls W and W' of which tubing are generally parallel, and in which are made inwardly concave grooves 89 coextensive with the vertical sidewalls, about the midcenter-line of the tubing. FIG. 8D is a cross-sectional view of FIG. 8C along the line B—B. Another slider shank 90 of rectangular box-shaped tubing having grooves 89 and 89' in the opposed vertical sidewalls 92 and 92' with rounded corners 88, is shown in FIG. 8E. Either shank is matingly fitted in a support beam 95 having a channel 94, as shown in FIG. 9, which beam is proportioned to be slidable over either shank 87 or 90. The channel 94 is formed by pendent, inwardly convex opposed sidewalls 96 and 96' arcuately directed towards one another in confronting relationship, and formed with an inner radius to closely match the rounded corners 88, the lower terminal portion of each convex sidewall fitting in the grooves 89 and 89'.

I claim:

1. A cargo carrier for a sports utility vehicle having a rear door or hatch and tail lights, said cargo carrier comprising, (i) a monorail in combination with (ii) a wheeled container having a rigid generally planar base pivotably disposed upon said monorail and releasably secured thereupon;

said monorail comprising, (a) a single rigid longitudinally extending support beam;

(b) a rigid slider shank adapted to be demountably secured to the frame of the vehicle, said support beam being non-rotatably telescopable relative to said slider shank from a retracted position proximately disposed relative to said vehicles rear door or hatch, to an extended position, said slider shank having a length sufficient to permit movement of said support beam and container thereupon to said extended position when said vehicle's rear gate or hatch may be opened, said monorail directly supporting only a minor portion of said base's area;

(c) a pair of pivot means secured to one longitudinal side of said support beam, and at least one attachment means secured opposite to one of said pivot means, said pivot means and attachment means being adapted to secure said container upon said support beam;

said container having fixedly secured thereto, (i) two spaced-apart locking means to be matingly received in said pivot means, and, (ii) coaxially spaced-apart wheels fixedly secured near one end of said base to allow said container to be rolled in an inclined attitude;

said locking means being securable in said pivot means without lifting said wheels off the ground;

said container having a width less than that of a doorway through which it is to be rollingly transported in an inclined attitude, and a length less than the spacing of said vehicle's tail lights.

2. The carrier of claim 1 wherein, said pivot means include pivot latches spaced apart at a distance at least corresponding to the width of said planar base, said attachment means includes an attachment latch, and said locking means include locking pins.

3. The carrier of claim 2 wherein said support beam is at least as long as said planar base is wide, and said attachment means includes a pair of attachment latches, each oppositely disposed relative to each said pivot means.

4. The carrier of claim 3 wherein said support beam has fixedly secured thereto, at a location distally disposed relative to said vehicle's frame, a socket means to matingly receive a vertical post of an accessory rack.

5. The carrier of claim 1 wherein said locking means are located along an axis above said coaxial wheels, at a distance which is at least the distance of said pivot means above the ground upon which said wheels rest.

6. The carrier of claim 2 wherein said container is frameless and includes a tub having a volume in the range from about 15–30 ft$^3$ (0.42–0.85 cubic meters).

7. The carrier of claim 6 wherein said tub is substantially rigid and formed of a light weight material selected from the group consisting of a synthetic resinous material, a fiber reinforced synthetic resinous material, a metal composite and aluminum.

8. The carrier of claim 3 wherein said support beam and slider shank are rigid, rectilinear, rectangular tubular struts, and said container is demountable by rotation in a vertical plane from only the side of said support beam on which side said pivot latches are positioned.

9. The carrier of claim 3 wherein said wheels on said tub are telescopable in a vertical direction to increase the distance between the axis of said wheels and the axis of said pivot pins, without moving said pivot pins.

10. The carrier of claim 3 wherein said pivot latches are oriented to receive said locking pins so that said support beam is in direct contact with a lower surface of said base, and said support beam extends across said base.

11. The carrier of claim 10 wherein said locking pins project from a base plate secured to said base's lower surface, said pivot latches are oriented to receive said locking pins so that said base plate is supported on said support beam.

* * * * *